May 3, 1938.  W. E. WOODARD  2,116,295
RAILWAY VEHICLE
Filed Feb. 1, 1935  5 Sheets-Sheet 1
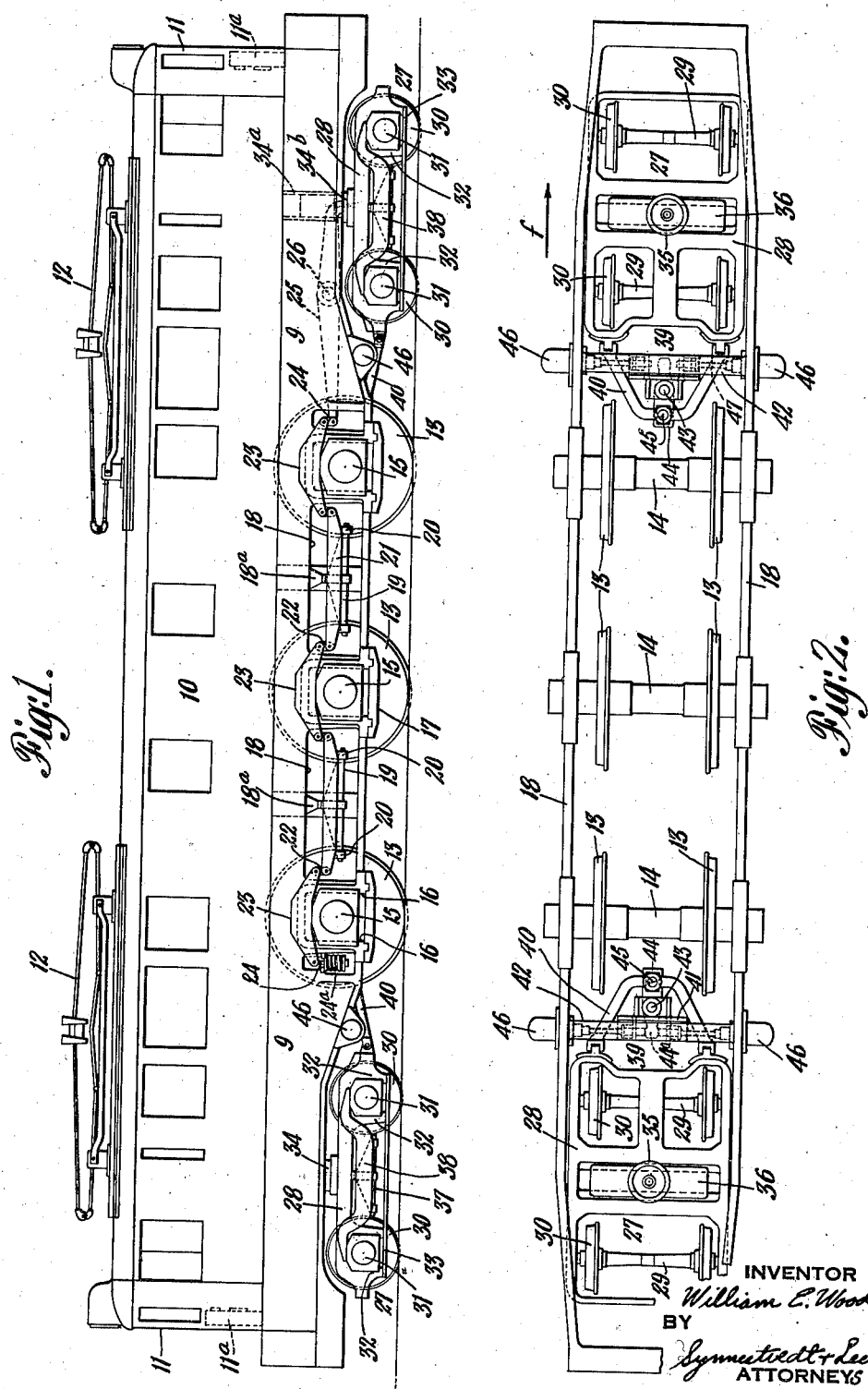

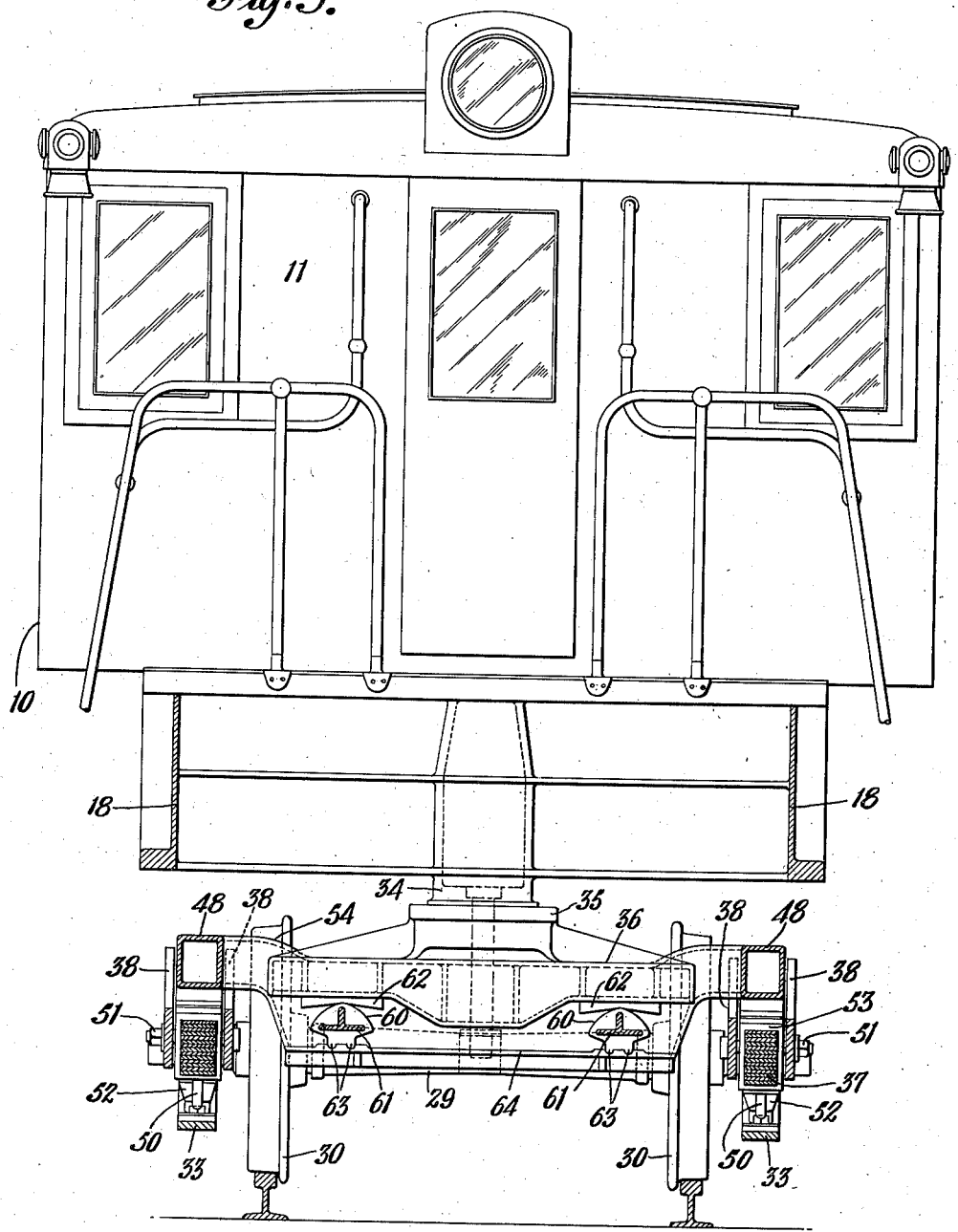

May 3, 1938.  W. E. WOODARD  2,116,295
RAILWAY VEHICLE
Filed Feb. 1, 1935  5 Sheets-Sheet 3
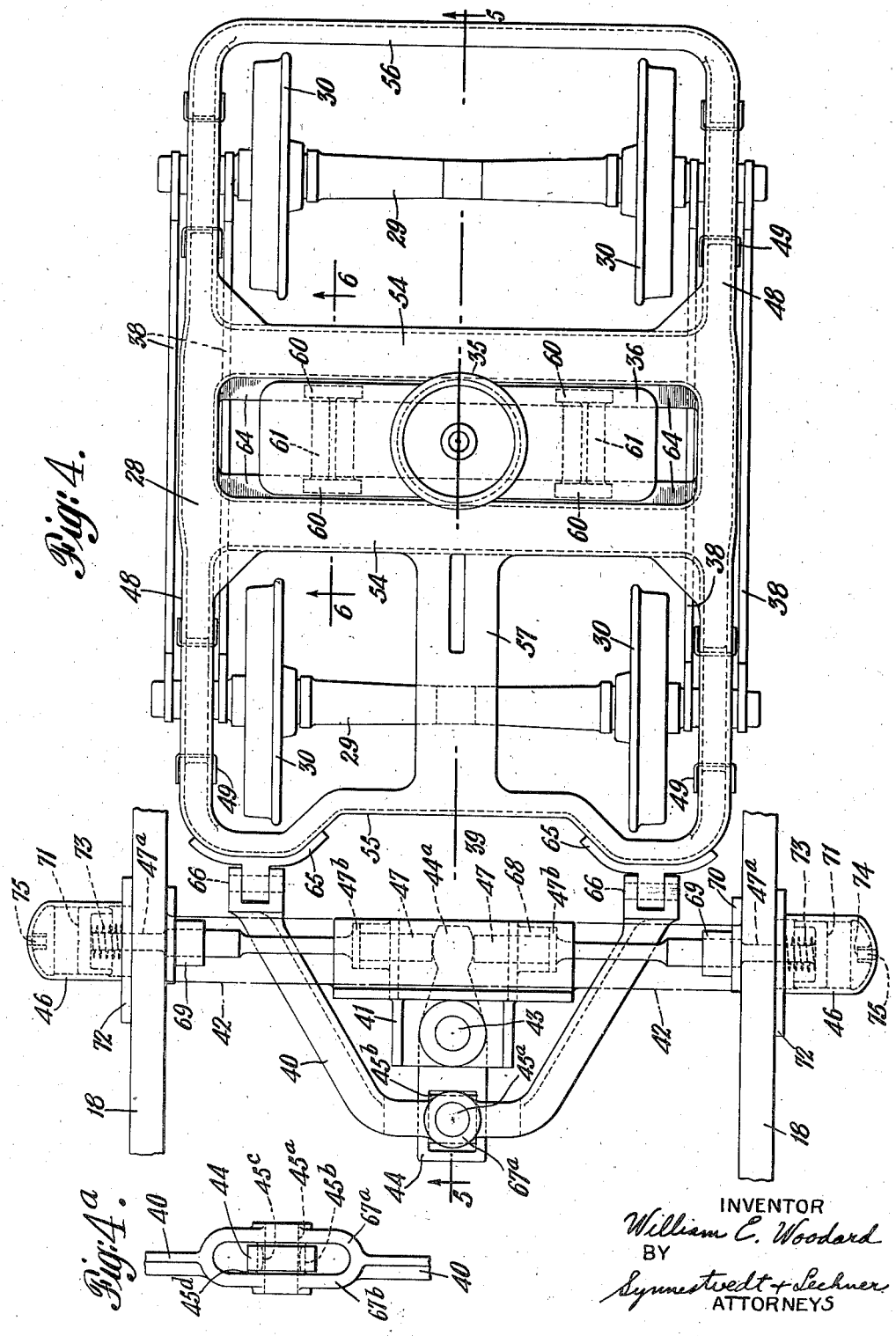

May 3, 1938.   W. E. WOODARD   2,116,295
RAILWAY VEHICLE
Filed Feb. 1, 1935   5 Sheets-Sheet 4
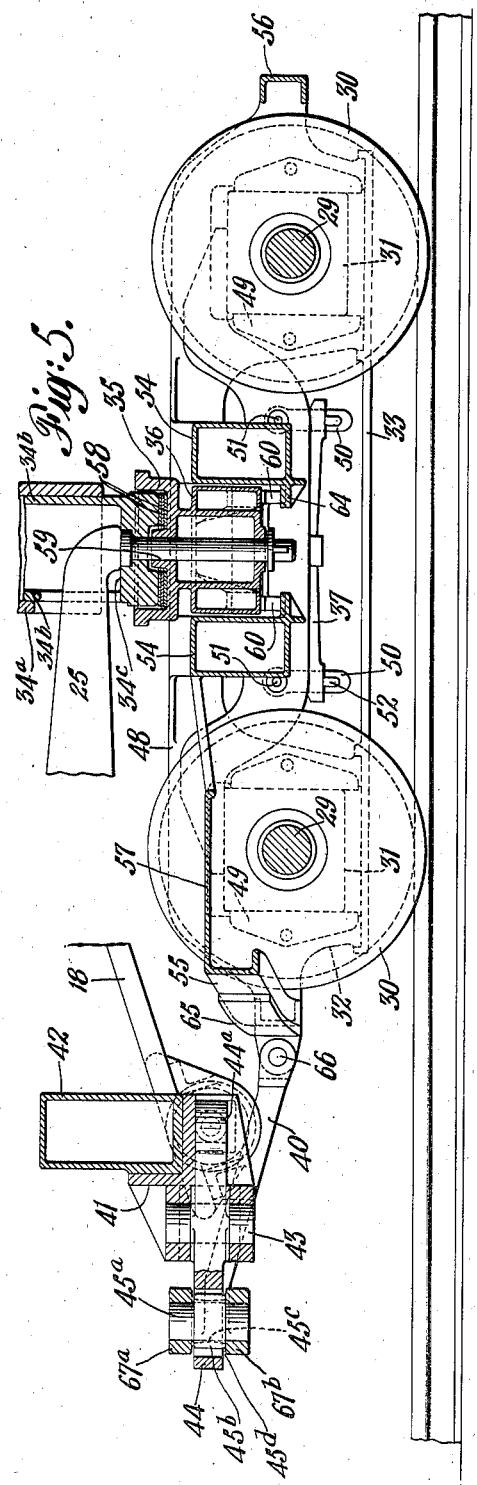
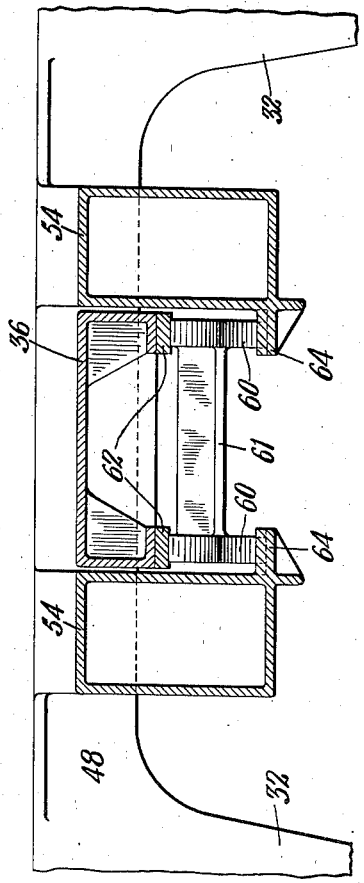
INVENTOR
William E. Woodard
BY
Synnestvedt + Lechner
ATTORNEYS

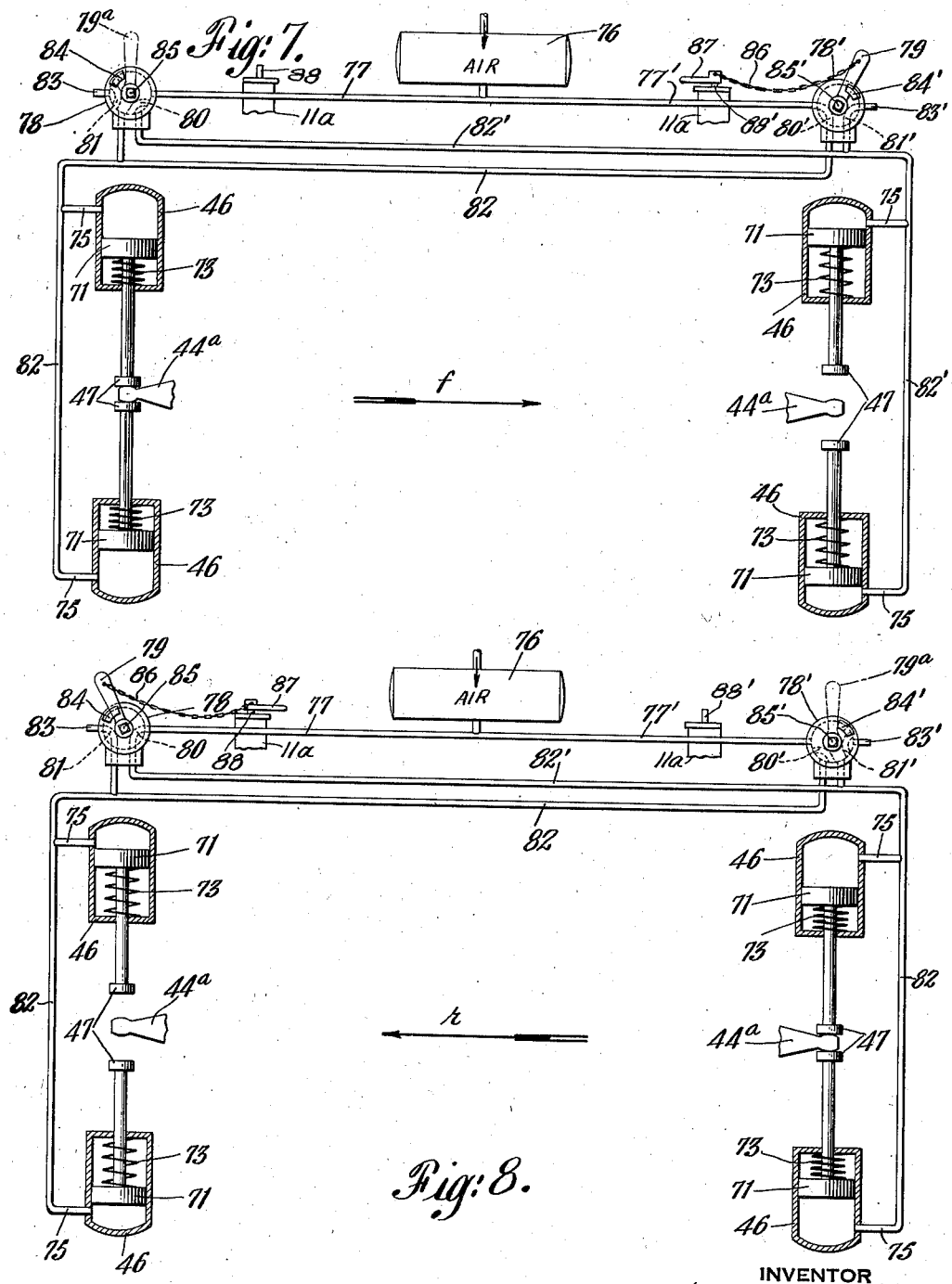

Patented May 3, 1938

2,116,295

UNITED STATES PATENT OFFICE 2,116,295

RAILWAY VEHICLE

William E. Woodard, Forest Hills, N. Y.

Application February 1, 1935, Serial No. 4,440

10 Claims. (Cl. 105—174)

This invention relates to railway vehicles, and particularly to running gear thereof, and is especially useful in locomotives or other self-propelled railway vehicles, particularly locomotives with a so-called rigid wheel base in an intermediate zone or region and trucks at the ends thereof.

While not limited to double-ended locomotives, such, for example, as electric or Diesel-electric equipment, the invention is especially advantageous in that field, and it will therefore be illustrated and described as being embodied in a double-ended electric locomotive having a plurality of main driving wheels mounted on axles which are journalled in the intermediate region of the main frame and arranged in a substantially symmetrical relationship with respect to each end of the locomotive, and having a pair of trucks, one mounted adjacent each end of the main frame, also in a symmetrical relationship, each preferably embodying a pair of axles, the wheels of which may or may not be power driven, although in the embodiment illustrated the truck wheels are not drive wheels. The objects and advantages of the present invention will be better understood after a brief statement of some of the difficulties encountered in the art.

In locomotives and the like, particularly those intended to be normally operated, indiscriminately, in either direction, it is sometimes necessary, and in fact desirable, for structural, functional, and other reasons, to arrange the frame, superstructure, controls, powers equipment, and other mechanism substantially symmetrically with respect to the two ends of the vehicle, and thus also to locate the center of gravity thereof approximately at the mid-point, considered longitudinally; or it may be that the weight distribution is substantially symmetrical, apart from structural symmetry. It is also convenient and desirable, both from structural and operational standpoints, as well as for other reasons, to arrange the running gear substantially symmetrically, and especially to mount a plurality of driving axles directly in the main frame, in the middle portion thereof, (to constitute what is ordinarily known in the art as the rigid wheel-base of the locomotive) and to mount one or more trucks adjacent or beneath each end thereof.

Sometimes even without such symmetrical arrangements, but more often with either a symmetrical weight distribution or a symmetrical wheel-base arrangement, and especially in a construction in which both are symmetrical, it has been found that an undesirable periodic vibration, oscillation, swinging, or "hunting" movement is set up, particularly in a lateral direction and especially at certain speeds of operation, such motion of the main structure of the locomotive being apparently about a vertical axis passing through the center of gravity, and apparently bearing either a synchronous or harmonic relationship to the natural or inherent swinging or vibration period of the main frame and the parts mounted thereon; and it may even be in some instances that this lateral oscillation is amplified or built up still further by a synchronous action of the swing-motion support of the truck bolsters in the trucks. In any event, the problem has been a serious one, both from the standpoint of safety in operation, and from the standpoint of damage to and breakage of the track and the equipment itself, (bent or spread rails, broken axles, derailments, etc., being not unknown, especially with heavy and powerful equipment), and the problem has been difficult if not impossible of solution, except by doing away with one or more of the symmetrical relationships, particularly by the deliberate avoidance of symmetrical truck and/or wheel arrangements.

It has heretofore been proposed, where symmetrical arrangements have been employed, to materially increase the resistance to lateral motion of one or more of the axles; to employ resilient control or cushioning devices of one kind or another; or to lock the truck frame (at one end of the vehicle) to a superimposed frame, or to the superstructure of the vehicle, allowing the truck at the other end of the vehicle to swing or turn in its usual manner, and to reverse this relationship upon a reversal of the direction of operation of the locomotive; but such arrangements have various incidental disadvantages. For instance, locking the truck frame, in certain proposed arrangements, renders it substantially rigid with the adjacent framing or superstructure, so that, in effect, it merely extends the rigid wheel base toward one end of the vehicle, which is undesirable. Furthermore, that plan, as well as others which have been tried, have various other disadvantages, such as the necessity for building the locomotive initially to incorporate the mechanism, or making extensive alterations on existing equipment in order to adapt them to the change; causing improper tracking action of the vehicle under certain circumstances; adding materially to the complication of the vehicle and/or the trucks; increasing the flange and rail wear; setting up of oscillations due to the very control devices themselves (particularly when they are of a resilient character); and so forth.

One of the primary objects of my invention is to obviate such difficulties of the prior art; not only the difficulties arising from synchronous or periodic oscillations but also the difficulties arising from the attempted cures; and I aim to accomplish these advantages in a very simple manner, and by mechanism which obtains a substantially true leading or guiding operation of the forward truck and a substantially true trailing-truck operation of the rear truck, when operating in one direction; and a reversal of that effect when operating the vehicle in the reverse direction.

The invention furthermore contemplates broadly the convertibility of a swiveling-type truck, particularly of swing-motion character, to a radial truck, and vice versa, at will; a novel and effective control or conversion system for such a truck; the employment of two such trucks, substantially counterparts if desired, at opposite ends of a rigid main wheel base; and the interaction of the control for the two trucks.

The invention further contemplates a truck conversion and control device which is readily adaptable to existing equipment with very little change; and more specifically the provision of a truck conversion unit, or truck modifier, which preferably comprises a radius bar and a cooperating truck articulation control device which are readily mountable, respectively, on a swiveling truck and on the main framing of existing locomotives.

The invention further involves a co-ordination, interlocking, or permanent association of the truck modifier control and the ordinary locomotive control whereby to insure the proper conditioning of the trucks for either direction of normal operation of the locomotive. A further object of the invention is to accomplish conversion at will, of a swivelling truck to a radial truck and vice versa, without necessarily disturbing the weight distribution on the truck axles and/or main axles or interfering with the proper operation of the equalizing and spring suspension mechanism, which in many locomotives is arranged to provide three virtual points of support for the main frame. Still other objects and advantages of the invention, as well as detailed novel features of utility, will be evident as the description proceeds.

How the foregoing objects and advantages are effectuated, together with other purposes and uses to which the invention may be put, or which may occur to those skilled in the art, will appear after consideration of the following description, taken together with the accompanying drawings, in which drawings:—

Figure 1 is a side elevational view (with certain details omitted) of an electric locomotive embodying the present invention;

Figure 2 is a top plan view of the locomotive frame and the running gear, with the superstructure and other parts of Figure 1 omitted, and with certain parts of the frame omitted and other parts broken away;

Figure 3 is an end elevation of the locomotive, on a larger scale, (viewed from the left-hand end of Figure 1), with certain of the frame and truck parts shown in transverse section;

Figure 4 is a plan view of one of the two counterpart trucks of the locomotive, illustrating in detail certain features of my invention, and showing fragmentarily certain parts of the locomotive frame;

Figure 4a is an end view of part of Figure 4, illustrating the radius bar pivot mount;

Figure 5 is a longitudinal section through the truck, taken approximately on the line 5—5 of Figure 4, and showing also (fragmentarily) the center pin construction and one of the associated equalizer members;

Figure 6 is a section on a still larger scale, taken on the line 6—6 of Figure 4;

Figure 7 is a diagrammatic view of the truck-converting control system (certain parts of which are shown in Figures 1, 2 and 4) illustrating the condition for operation of the locomotive in the direction indicated by the arrow, which is the same direction as indicated in Figure 2; and Figure 8 is a view similar to Figure 7, but illustrating the condition of the mechanism for operating the locomotive in the opposite direction.

Turning now to Figures 1 to 3 inclusive, it will be seen that I have illustrated a double-ended electric locomotive incorporating a main frame 9, a superstructure shell or housing 10 having operating cabs 11, 11, expansible pantographs 12, 12, and running gear comprising three pairs of main or driving wheels 13, the axles 14 of which are journalled in boxes such as roller bearing boxes 15 which are vertically slidable in the pedestal ways 16, the pedestal jaws being connected by the usual pedestal ties 17. Weight is transmitted from the side portions or members 18 of the main frame, to the boxes 15, through the intermediation of suitable yielding and equalizing mechanism, such as the brackets 18a, springs 19, spring seats 20, equalizer bars 21 between the axles, intermediate links 22, equalizer members 23 over the axle boxes, end links 24, end springs 24a (one at each side of the locomotive), and end equalizer members 25 which are pivoted at 26 on the main frame and the free ends of which converge over one of the trucks so as to bear upon the truck bolster, hereinafter to be referred to, through the intermediation of the center pin mechanism.

Beneath each end of the main frame 9 is a swiveling truck indicated generally by the reference character 27, such truck comprising a frame 28, in which two axles 29 with their wheels 30 are journalled, as by means of the roller bearing journal boxes 31 which are vertically slidable in pedestal ways 32, the latter being tied together at the bottom by the bars 33. As seen in Figure 3, the center pin device 34 at one end of the locomotive seats (for relative rotative motion) in a weight-receiving pocket or seat member 35 of the truck, such center pin seat being mounted on the swing-motion bolster 36. Transmission of weight from the center pin construction through the bolster and thence to the truck frame, is carried on down to the axle boxes, by means of the springs 37, equalizer bars 38, and necessary linkages. At the other end of the locomotive frame, the center pin device comprises a fixed cylindrical member 34a and a second member 34b positioned thereby but mounted for relative vertical sliding motion therein; and (as best seen in Figure 5) the latter member seats in the truck center-pin seat 35. The weight is transmitted to this truck, not through member 34a, but through the converging ends of the equalizers 25, which extend through apertures in the center pin members 34a, 34b and bear upon the base portion 34c of the center pin. By the above mechanism, weight of the superstructure is transmitted independently to one truck through its center pin, while the other truck receives weight through two side equalizer systems common to it and to the main drivers, whereby there is an approximation of 3-point support.

Of the foregoing general arrangement of the locomotive, there is shown in Figures 1 and 2, sufficient to bring out the general symmetry of the superstructure and of the running gear. It will be understood that the heavy equipment carried in or forming part of the superstructure 10 is normally, in such a locomotive, also arranged substantially symmetrically with respect to the two ends of the vehicle, as are also the normal controls for the locomotive, indicated diagrammatically in the cabs at 11a. While numerous details are omitted from those figures, particularly Figure 2, such as various transverse frame parts, brake rigging, coupler mechanism, etc., sufficient of the wheel and truck arrangements is shown to illustrate the general identity of the wheel and truck arrangement of the two ends of the running gear. The truck structure itself will be hereinafter explained in greater detail, when reference is made to Figures 3 to 6 inclusive, but before proceeding to that description I will now briefly describe certain features of my invention as shown in outline in Figures 1 and 2.

At each truck 27, I arrange a conversion mechanism indicated generally by the reference character 39, which mechanism comprises a radius bar 40 pivotally connected to the truck frame at the inner end of the latter, and mechanism for alternatively pivotally securing or freeing said radius bar with respect to the vehicle frame, substantially as follows: a heavy bracket 41 is rigidly secured to the bottom of a main cross member 42 of the locomotive frame and carries, as by means of a pivot 43, a laterally swingable radius bar pivot mounting member or yoke 44, in which the radius bar 40 has a pivotally and longitudinally slidable mounting at 45. Air cylinders 46, mounted on the side frame members 18 of the locomotive are adapted to force the plungers 47 against the two sides of the yoke arm 44a, whereby the movable mounting 45 of the radius bar 40 may be rigidly fixed as against movement transversely of the main frame (as seen at the left-hand end of Figure 2). The like parts associated with the truck at the right-hand end of Figure 2 are shown in their positions for freeing the yoke of the radius bar, so that unimpeded swiveling of that truck may occur, the radius bar 40 of the truck at the right-hand end exerting no control over the truck swiveling action under conditions when that truck is operating as the leading truck, the locomotive moving in the direction of the arrow f.

The construction and operation of the truck and associated mechanism will be more clearly understood from inspection of Figures 3 to 6 inclusive. The axles 29 of the truck wheels 30, as before mentioned, are journalled in boxes 31 (see Figure 5) which are vertically slidable in the pedestals or guideways 32 of the side frame members 48 of the truck frame 28, suitable pedestal-jaw wear members 49 (Fig. 4) being also preferably employed. The equalizer bars 38, which are made in pairs at each side of the truck, one of each pair being outside the plane of the side frame member of the truck and the other of the pair being inside the plane thereof (as seen in Figs. 3 and 4), rest at their ends upon the boxes 31; and each pair of equalizer bars receives weight from a spring 37 (Figs. 3 and 5) by means of links 50 which are carried on the equalizer bars by the pivot bolts 51, and which take weight from the ends of the springs by means of the keys or gibs 52. A bracket and a spring band 53 transmit the weight from the side frame member 48 to the spring 37.

In addition to the side frame members 48, the truck frame 28 comprises a pair of more or less centralized transverse members or transoms 54, and inner end and outer end transverse members 55 and 56, respectively. A central longitudinal brace 57 may also be employed, if desired. The center pin seat member or center bearing 35 of the truck (which may have the usual pads 58 and pivot pin aperture 59, as seen in Fig. 5) is formed rigid with the bolster 36, which latter lies in the aperture formed between the transoms 54 and the side members of the frame. The clearance between the bolsters and transoms 54 is relatively slight, so as to retain the bolster as against appreciable movement in a direction longitudinally of the truck, but it will be noted that the ends of the bolster have a substantial clearance relative to the inner faces of the side frame members so as to provide for a considerable degree of lateral swing motion between the truck frame and the bolster.

I provide for a considerable resistance to relative lateral motion between the bolster and the truck frame, by means of the inverted rocker devices 60. The rocker devices, which are interconnected in pairs by the T-shaped webs 61 (see Figs. 3 and 6), receive weight from the bolster by means of the pads 62 which have inclined faces on the bottom, and transmit the weight to the transoms by means of semi-circular seats 63 which rest in corresponding seats formed in the flanges 64 of the two transoms. It will readily be seen that a resistance to relative lateral motion between the bolster and the truck frame (from the mid-position shown in Fig. 3) will be present, and this resistance can be made any desired amount, by suitably proportioning the rockers and the slope of the pads 62; the weight imposed through the bolster acting always to restore the parts to their normal mid-position, upon relative lateral displacement. According to the contours and proportioning of the parts 60 and 62, the lateral resistance may be made constant or variable, as is known in this art. In the absence of the conversion mechanism now to be described, the truck will act under all circumstances as an ordinary swiveling truck, pivoting about the center pin construction, and allowing a restrained lateral motion of the center pin (or of the truck relative to the center-pin) by virtue of the rocker-mounting of the bolster in the frame as just described.

With no other alteration to the truck than the welding or riveting of a couple of brackets 65, onto the inner end transom 55, I am enabled to apply to it the mechanism of the present invention (as seen in Figs. 4, 4a and 5). The radius bar 40 is pivoted to the brackets 65 by a couple of pivot pins 66. The apex of the radius bar divides to form a yoke composed of upper and lower members 67a and 67b, which are vertically apertured to receive the pivot pin 45a. Between the yoke parts 67a and 67b is fitted the longitudinally extending yoke 44 in which is mounted a sliding block 45b which is also vertically apertured to receive the pivot pin 45, the aperture having an internally-convex contour 45c permitting some angling movement of the radius bar pivot and thus of the radius bar.

The yoke member 44 is in turn pivoted by the pivot 43 in the bracket member 41 (which, as before mentioned, is rigidly secured upon the locomotive main frame cross member 42) and carries the extended arm or lever 44a, positioned between the two plunger members 47. These plungers are carried in fixed bearings or sleeves 68 and 69, mounted, respectively, on the brackets 41 and 70, the latter bracket being mounted on the side frame member 18 of the locomotive. The outer end 47a of each plunger 47 is connected to a piston 71 which is slidable in the cylinder 46, the latter being mounted on the main side frame member 18 in any suitable manner as by means of a bracket 72.

The swiveling action of the truck about its center bearing 35 would normally swing the radius bar from side to side, and by means of the yoke member 44 which is pivoted at 43 and extends at 44a in between the plungers 47, would naturally separate such plungers, forcing them outwardly until they took the position indicated on the truck at the right-hand end of Figure 2; but I prefer to positively disengage the plungers 47 from the control arm 44a, when the truck is to have its freedom for normal swiveling action, and to this end I may provide a coil spring 73 within each cylinder 46, normally urging the piston 71 outwardly against the stop device 74, which latter may at the same time be formed with an inlet opening 75 for a compressed air pipe connection.

For effecting the conversion of the truck from a swiveling truck to a radial truck, compressed air, or any other available fluid under pressure, may be admitted through the openings 75 into the cylinders 46, thus forcing the pistons 71 inwardly against the pressure of the springs 73, to the position shown in Figure 4, in which the plungers 47 are against the sides of the yoke-arm 44a. To assure an absolute centering of the yoke-arm, by the two pistons, (and thus an accurate centering of the radius-bar pivot 45a) the plungers 47 may have fixed collars 47b which come up against the bearing sleeves 68, the latter thus serving also as stops for the inward motion of the plungers 47. The operation of the truck, first as a swiveling truck, and afterwards as a radial truck, will now be described; and, in following this description, reference may be had to Figures 2 to 5 inclusive.

When the locomotive encounters a curve or any lateral track irregularity, the leading (swiveling) truck turns in the appropriate direction about the axis of its center bearing 35; a slight lateral motion also occurring, between the truck frame 28 and the truck bolster 36; the amount of swiveling motion and swing motion being, of course, dependent upon the degree of curvature or other track condition. Since, in accordance with the invention, there is no air pressure in the cylinders 46 of the leading truck, the springs 73 keep the plungers 47 out of contact with the arm 44a of the yoke 44. The yoke 44 therefore has no function at this time, but is free to oscillate about its pivot 43 in either direction, in accordance with the urging of the radius bar 40, which latter is carried bodily to one side or the other according to the direction of swiveling of the truck frame. Since the bodily displacement of the radius bar 40, during swiveling, takes place about the axis of the truck center bearing, and since the resultant lateral oscillation of the yoke member 44 takes place about a different center, to wit: the axis of its pivot pin 43, there must be accommodated a relative pivotation and longitudinal sliding motion between the radius bar 40 and the yoke member 44, and this is accomplished by virtue of the pivot 45a and the sliding block 45b. Furthermore, since there are springs and equalizers in the truck, with resultant freedom for a certain degree of up-and-down and rocking motion of the truck frame relative to the truck wheels and to the vehicle frame, there must be freedom of relative angling in a vertical direction between the radius bar 40 and the truck frame 28, which is accommodated by the pivot pins 66, and to this end there is also preferably provided the arcuate face 45c in the pivot block as well as a slight play or clearance between the upper and lower faces of the yoke 44 and the adjacent faces of the parts 67a and 67b of the radius bar, such a clearance being indicated at 45d (Fig. 5). Thus, during the operation above described, the radius bar "floats", as it were, and has no appreciable effect upon the action of the truck.

Under similar operating conditions of the locomotive, the rear truck operates as a radial trailer truck. Since, in accordance with the invention, the said trailing or following truck has air pressure admitted through the ports 75 into the cylinders 46, the plungers 47 are forced inwardly until the limiting stops 47b contact with the fixed sleeves 68, at which time the arm 44a of the yoke 44 is centered, considered laterally of the vehicle. This fixes the lateral location of the radius bar pivot pin 45a, relative to the main frame of the locomotive; and the lateral displacement of the truck, to accommodate the track conditions, must take place about the axis of pivot 45a as a center; and in such operation the truck frame 28 has a considerable lateral displacement relative to the truck bolster, since the lateral location of the bolster with respect to the superstructure is fixed by virtue of the center pin connection. Rocking of the truck frame in vertical planes is accommodated, as before, primarily by the pivotal connection 66 between the truck frame and the radius bar, and also by the clearances 45c, 45d adjacent the radius bar pivot.

Turning now to Figures 7 and 8, it will be observed that they show diagrammatically not only a truck-conversion control system but also the following parts of both trucks of the locomotive; the radius bar yoke arms 44a, the air cylinders 46, the plungers 47, the pistons 71 with their springs 73, and the air pressure inlets 75. Figure 7 discloses the truck conditions for the direction of operation of the locomotive indicated by the arrow *f*, which for convenience may be considered as forward operation; and Figure 8 discloses the truck conditions for the direction of operation of the locomotive indicated by the arrow *r*, which for convenience may be considered as reverse operation.

From the compressed air reservoir 76 of the locomotive, air is conducted by the piping 77, 77' to the truck control valves 78, 78'.

There is but one valve handle 79 for the locomotive (which is made removable from the valves), such handle being adapted to fit between the face of the valve casing and an arcuate guide member 84 (or 84') which is so positioned that the handle can only be removed from the valve when it is operated to the "dead" position indicated at 79a. In moving the handle to the position 79a it comes out of the slot provided by the member 84 (or 84'), whereupon it can be pulled off of the valve stem 85 (or 85'). In short, a bayonet or any other suitable interlock may be employed.

If the handle 79 be removed from the valve 78 in one cab of the locomotive (as seen at the left in Figure 7), the pressure and exhaust ports 80 and 81 of that valve are blanked. When the handle 79 is applied to the valve 78' in the control cab at the head end of the locomotive (for operation in the direction of the arrow f) and turned to the full-line position shown at the right of Figure 7, the pressure port 80' of said valve connects the air line 77' to the piping 82 leading to the air inlets 75 of cylinders 46 for the following truck, and the valve port 81' connects to the exhaust outlet 83' the piping 82' leading from the air ports 75 of cylinders 46 of the leading truck.

It will thus be seen, from Figure 7, that when the engineer applies the valve handle 79 to the valve 78', and turns it to the full-line position shown, the yoke arm 44a of the leading truck is free and the yoke arm 44a of the following truck is fixed, so as to fix the radius bar pivot of the following truck. The leading truck thus has its normal swiveling action and the following truck has its normal radial action.

When the engineer moves his usual controls to the opposite cab of the locomotive, as is customary, for example upon reaching a terminal, the handle 79 is removed from valves 78' and applied to valve 78 (as seen in Figure 8) and when placed in the full-line position shown in that figure, all the conditions with respect to the two trucks are reversed, for operation of the locomotive in the direction of the arrow r.

In ordinary steam locomotive practice, it has become quite customary to design the locomotive with a 4-wheel swiveling leading truck, a series of driving wheels mounted in the main frame, and a 4-wheel radial trailer truck, and such design has been found to have very good riding and tracking qualities, as well as being advantageous for other reasons. By my invention, a similar desirable action may be obtained, in substantially any type of railway vehicle, and regardless of whether the vehicle is operating in a forward direction or in a reverse direction; and in double-ended locomotives, which do not need to be turned around on turntables, at the terminals, the invention is of especial benefit, and particularly if the weight distribution and the running gear arrangement are substantially symmetrical. In any event, the structure and operation of the invention are such as to check or prevent tendencies toward severe periodic or synchronous vibrations or oscillations of the locomotive. Furthermore, the truck conversion is accomplished in such a way that, even in locomotives such as illustrated (where the weight transmission to one of the trucks is equalized with the main drivers), the operation of this invention upon either truck does not interfere with the weight distributing and equalizing system.

The control system for the truck conversion mechanism of this invention may be made foolproof, i. e., so arranged that the operator is compelled or automatically induced to condition the trucks to correspond with the normal direction of operation of the locomotive. This is accomplished as follows:

Double-ended electric locomotives are customarily arranged to have only one set of control handles (comprising essentially the motor and brake control handles) which the operator carries with him to that end of the locomotive which is "head end" for the normal operation contemplated. According to the present invention, I preferably provide for the coordination of the truck control handle 79 with one or more of the normal locomotive control handles. This may be done (as shown in Figures 7 and 8) by permanently associating the handle 79, as by connecting it by means of a slack length of chain or the like, shown at 86, with the ordinary locomotive control handle 87, which may be slipped on and off of the operating stem 88 of the locomotive controller 11a (at one end of the locomotive) or alternatively on and off of the similar stem 88' of the controller 11a (in the other cab of the locomotive).

Thus the operator is compelled to take handle 79 to that end of the locomotive to which he normally takes the other control handles, thus insuring that the truck converting mechanism is put into the condition corresponding with the direction of normal operation determined by said other (normal) locomotive controls. It will be obvious that the particular control station normally employed, especially when the locomotive is out on the road, and operating at speeds, is the station at what is the "head end" for that particular direction of motion.

I claim:—

1. In a railway vehicle, the combination, with a main frame, of a wheeled truck, a swiveling center bearing fixed as against lateral and longitudinal movement with respect to the main frame and transmitting weight from the main frame, through a lateral motion mounting, to the truck wheels, a radius bar pivoted at one end to the truck for vertical swinging and having at the other end a radius bar pivot, means for vertically supporting the latter end of said radius bar from the main frame with freedom for longitudinal movement relative thereto, and transversely movable means for laterally fixing and freeing said radius bar pivot with relation to the main frame.

2. In a railway vehicle, the combination, with a main frame, of a truck having a swing-motion bolster, a swiveling center bearing transmitting weight from the main frame to said bolster, and fixing the bolster center both laterally and longitudinally with respect to the main frame, a radius bar for the truck having a pivot, and mechanism for laterally fixing and freeing said radius bar pivot with relation to the main frame including means providing freedom for movement of the radius bar in the vertical longitudinal plane with respect to the main frame.

3. A railway vehicle truck comprising a truck frame, a bolster carrying a center bearing, means mounting the bolster on said frame with freedom for lateral motion, a radius bar pivotally secured to the truck frame, means for pivotally connecting said radius bar to the vehicle whereby to constrain the truck frame to swing laterally about an axis other than the axis of the center bearing, and means for rendering said connection ineffective for such constraint without disconnecting same from the vehicle.

4. A railway vehicle truck comprising a truck frame, axles with their wheels, yielding weight transmission means interposed between said frame and the axles, a bolster carrying a weight receiving center bearing, means mounting the bolster on said frame with freedom for lateral motion, a radius bar pivotally secured to the truck frame on a pivot axis extending substantially transversely of the truck whereby said truck frame may have motion on its yielding support in a vertical direction with relation to the radius bar but is fixed as against lateral motion with relation to the radius bar, means for pivotally connecting said radius bar to the vehicle whereby to constrain the truck frame to swing laterally about an axis other than the axis of the center bearing, and means for rendering said connection ineffective for such constraint.

5. A railway vehicle truck comprising a truck frame, a weight receiving center bearing, a bolster mounting said bearing and having freedom for lateral motion with respect to said frame, centering means yieldingly opposing said lateral motion, a radius bar pivotally secured to said frame on a transverse axis, means for pivoting the radius bar to the vehicle upon an axis the location of which is fixed laterally with respect to the vehicle for fixation of the point of pivoting of the radius bar and thus of the truck frame, and means for freeing said radius bar from the effect of such fixation.

6. A railway vehicle truck comprising a truck frame, a weight receiving center bearing, a bolster mounting said bearing at a fixed axis with respect to the vehicle and having freedom for lateral motion with respect to said truck frame, weight-actuated centering means yieldingly opposing said lateral motion, a non-weight-transmitting radius bar movably secured to said truck frame for relative angling with relation thereto in a vertical plane, means for pivoting the radius bar to the vehicle upon an axis the location of which is fixed laterally but movable longitudinally with respect to the vehicle for lateral fixation of the point of pivoting of the radius bar and thus of the truck frame, and means for freeing said radius bar from the effect of such fixation, by which arrangement the truck is adapted to operate alternatively as a swiveling truck or as a radial truck, with the weight and thrust imposed on it through said center bearing in either event.

7. In a railway vehicle, the combination, with the main frame and the frame of a swing-motion swiveling truck, of a radius bar extending longitudinally from the truck frame, a longitudinally extending member pivotally mounted on the main frame for oscillation in a substantially horizontal plane, a pivot interconnecting said member and said radius bar at a point longitudinally removed from the first mentioned pivotal connection, and adjustable means movable laterally, in position to cooperate with said member to restrict the lateral motion of said member about its pivotal mounting.

8. A railway vehicle truck conversion unit comprising a radius bar with pivot means at one end on a transverse axis for securing the bar to a truck, a radius bar supporting and centering member extending longitudinally and having an upright pivot device for mounting the same on the vehicle proper, an upright pivot device connected to the free end of the radius bar and spaced longitudinally from the first mentioned upright pivot, a longitudinally slidable mounting for the upright radius bar pivot in said member, and means on said member adapted for engagement with stop devices for preventing horizontal swinging of said member.

9. In a railway vehicle, a main frame with wheeled axles mounted therein; a truck adjacent each end of the main frame, each truck comprising a frame, a bolster pivotally associated with the main frame at a fixed point and a lateral-motion mounting between the bolster and the truck frame; apparatus for constraining either of said trucks, at will, to move as a radial truck about a pivot longitudinally offset from the bolster pivot whereby said trucks are selectively capable of two different pivotal motions in the horizontal plane; mechanism transmitting weight from the main frame to one of said trucks independently of the said wheeled axles and mechanism including an equalizer system commonly transmitting weight to said wheeled axles and the other of said trucks, said mechanism being constructed and positioned to accommodate either of said motions of both trucks.

10. In a railway vehicle, a main frame with wheeled axles mounted therein; a truck adjacent each end of the main frame, each truck comprising a frame, a bolster pivotally associated with the main frame at a fixed point and a lateral-motion mounting between the bolster and the truck frame; apparatus for constraining either of said trucks, at will, to move as a radial truck about a pivot longitudinally offset from the bolster pivot, whereby said trucks are selectively capable of two different pivotal motions in the horizontal plane; mechanism comprising a center bearing directly transmitting weight from the main frame to the bolster of one of said trucks independently of the said wheeled axles and mechanism comprising an equalizer system having equalizing lever means pivoted on the main frame and commonly transmitting weight to said wheeled axles and to the bolster of the other truck, whereby the weight transmission system accommodates the said different motions of both trucks.

WILLIAM E. WOODARD.